(12) United States Patent
Alfonso et al.

(10) Patent No.: US 9,258,145 B2
(45) Date of Patent: Feb. 9, 2016

(54) METHOD AND SYSTEM FOR DISTRIBUTION OF INFORMATION CONTENTS AND CORRESPONDING COMPUTER PROGRAM PRODUCT

(75) Inventors: Daniele Alfonso, Magenta (IT); Tea Anselmo, Bibiana (IT); Nicola Capovilla, Merate (IT); Alexandro Sentinelli, Milan (IT); Amit Kumar, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1450 days.

(21) Appl. No.: 12/822,053

(22) Filed: Jun. 23, 2010

(65) Prior Publication Data

US 2010/0332671 A1    Dec. 30, 2010

(30) Foreign Application Priority Data

Jun. 25, 2009    (IT) .............................. TO2009A0485

(51) Int. Cl.
  *G06F 15/16*    (2006.01)
  *H04L 12/64*    (2006.01)

(52) U.S. Cl.
  CPC ................................. *H04L 12/6418* (2013.01)

(58) Field of Classification Search
  USPC ................................................. 709/230, 231
  See application file for complete search history.

(56) References Cited

U.S. PATENT DOCUMENTS

| | | | | |
|---|---|---|---|---|
| 4,255,814 | A | 3/1981 | Osborn | ........................... 455/51 |
| 8,386,630 | B1 * | 2/2013 | Atzmon | ........................ 709/231 |
| 2002/0136219 | A1 * | 9/2002 | Ding et al. | .................... 370/394 |
| 2004/0143672 | A1 * | 7/2004 | Padmanabham et al. | ...... 709/231 |
| 2006/0080454 | A1 * | 4/2006 | Li | .................................. 709/231 |
| 2006/0190615 | A1 * | 8/2006 | Panwar et al. | ................. 709/231 |
| 2006/0242155 | A1 * | 10/2006 | Moore et al. | ..................... 707/10 |
| 2007/0112811 | A1 | 5/2007 | Shen et al. | ..................... 707/101 |

(Continued)

FOREIGN PATENT DOCUMENTS

| | | |
|---|---|---|
| WO | 03/009577 | 1/2003 |
| WO | 2008/012488 | 1/2008 |

OTHER PUBLICATIONS

Padmanabhan et al., "Supporting Heterogeneity and Congestion Control in Peer-to-Peer Multicast Streaming" IPTPS, 2004, 6 pages.

(Continued)

*Primary Examiner* — Hee Soo Kim
(74) *Attorney, Agent, or Firm* — Seed IP Law Group PLLC

(57) ABSTRACT

The interfacing of coded media data packets in the transfer from and to a peer-to-peer network envisages that the data packets are included in groups of packets that may have lengths different from one another. Each group of data packets is encapsulated in a group of chunks of given length. The media data is made available in the network as a multiplicity of different descriptions of a multiple-description coding of one and the same media content. The terminals of the peer-to-peer network are configured for accessing selectively the multiplicity of different descriptions of said media contents, combining them with one another, or else accessing one of the different descriptions in substitution for another preserving access to the media contents. The data may be made available as base layer and at least one enhancement layer of one and the same media content.

43 Claims, 9 Drawing Sheets

(56) References Cited

U.S. PATENT DOCUMENTS

| | | | |
|---|---|---|---|
| 2007/0201549 A1* | 8/2007 | Hannuksela et al. | 375/240.01 |
| 2009/0037968 A1* | 2/2009 | Liu et al. | 725/114 |
| 2009/0083394 A1* | 3/2009 | Diot et al. | 709/218 |
| 2010/0153575 A1* | 6/2010 | Liu et al. | 709/231 |
| 2010/0180043 A1* | 7/2010 | Lau et al. | 709/231 |
| 2011/0038386 A1* | 2/2011 | Berthelot et al. | 370/474 |

OTHER PUBLICATIONS

Rieckh, "Scalable Video for Peer-to-Peer Streaming" Master Thesis, Institute of Communications and Radio-Frequency Engineering, Technical University of Vienna, Summer 2008, 53 pages.

Venkataraman et al., "Chunkyspread: Heterogeneous Unstructured Tree-Based Peer-to-Peer Multicast" Proceedings of the ICNP, 2006, 10 pages.

* cited by examiner

METHOD AND SYSTEM FOR DISTRIBUTION OF INFORMATION CONTENTS AND CORRESPONDING COMPUTER PROGRAM PRODUCT

BACKGROUND

Description of the Related Art

Peer-to-Peer (P2P) systems have become very popular also thanks to the file-sharing programs: Napster, BitTorrent, Gnutella, Kazaa and several others. In particular, the Kazaa solution is based upon the criterion of exploiting the computational power and availability of resources in P2P systems for developing one of the most successful clients for VoIP (Voice over IP: Skype) systems. Skype can readily be downloaded and has changed the modalities of communication between people, thus achieving a considerable commercial success precisely because the Skype client does not require any dedicated infrastructure and instead relies upon a set of supernodes that are common peers available on line with a good bandwidth and a public IP address. The hypothesis of creating something similar as regards the video contents is attractive, but calls for taking into account the fact that the voice traffic does not require a bandwidth as wide as video streaming: in practice, the bandwidth of the voice traffic is at least two orders of magnitude smaller than that of the video traffic, if the webcam is deactivated during the call.

Any P2P application, whether of a file-sharing type or of a streaming type, is based upon the infrastructure developed by different users organized in overlay. The P2P systems create the network and manage distribution of the contents at an applicational level. The overlay can be created and managed in ways that depend upon the nature of the application.

In general, the contents are divided into "chunks" and then re-assembled, client side, in the right order. In the case of file-sharing, the entire file is downloaded and reproduced off-line, without any limitation in terms of bandwidth or time delay. Instead, streaming applications of the "Video On Demand" type require starting the reproduction whilst the file is still being downloaded, with the need to satisfy constraints in terms of bandwidth and time. The same considerations also apply to "live streaming", where, however, the peers do not share the entire content but just a small data buffer.

The sector of P2P video-streaming forms at the moment the subject of considerable research activity, with the aim of optimizing three important factors, namely:

i) the time that elapses from when the user "tunes" on the channel and the moment in which the video content is available (so-called "start-up delay");

ii) the delay between the source of the content and the receiver (known also as "playback delay" or "end-to-end delay"); and iii) the count of the frames rendered in the right order by the reproducer (so-called "playback-continuity index").

The majority of the systems considered in this context can be classified on the basis of the distribution graph that they implement and can be roughly classified as tree systems and as mesh systems, whilst there also exists a certain number of hybrid solutions.

In tree-distribution systems, we can imagine an actual tree, the nodes and leaves of which represent the peers that are addressees of the distribution of the contents, starting from the source of the contents. If the peers do not change too often, the configuration of the tree will not undergo modifications. Such a system does not require a large overhead in so far as the packets can be distributed hierarchically from node to node, without any need for additional messages.

Overlays of a mesh type implement a mesh-distribution graph, where each node contacts a subset of peers to obtain a certain number of chunks. Each node needs to know which chunks are available at its peers and explicitly requests the chunks that it needs. This mode of operation necessarily generates overhead, in part on account of the exchange of the buffer maps between the various nodes (in practice, the nodes make known the set of chunks available on them) and in part on account of the request or "pull" process (each node sends a request in order to receive the chunks that it needs). On account of the fact that, to find the contents that it needs, each node can rely upon multiple peers, systems of a mesh type offer a considerable robustness in regard to any failure of the nodes. As negative aspect, mesh systems require rather large buffers for supporting the pull process. The need for large buffers is dictated by the desire to improve the possibility of finding the missing chunks in the reproduction sequence.

Amongst these schemes there may moreover be cited CoopNet (described by V. Padmanabhan et al. in "Supporting Heterogeneity and Congestion Control in P2P Multicast Streaming", IPTPS, 2004), or else ChunkySpread (described by V. Venkataraman et al. in "ChunkySpread: Heterogeneous Unstructured Tree-based Peer-to-Peer Multicast", in IEEE ICNP, 2006) that aim at mitigating the marked dependence of a peer upon its antecedents in architectures based upon a single tree. These schemes are, in fact, designed so as to operate with advanced video-coding techniques. For example, CoopNet uses a multiple-description coding (MDC) that codes a media stream in a number of multiple independent descriptions. It constructs multiple independent multicast trees, one for each sub-stream. A peer can improve its quality in terms of media reception by coming to form part of a number of multicast trees with the limit represented by its capacity of downlink connection.

These hybrid schemes (which mix in a certain way tree philosophy with mesh philosophy) aim at obtaining the best performance of two approaches: robustness in regard to a high churn rate (typical of mesh networks) and a higher efficiency in terms of traffic overhead (typical of tree networks) via a more orderly distribution of the requests.

These families of P2P streaming protocols adapt conceptually to the concept of ordering the video into a number of layers or descriptions. The use within one and the same client of both approaches, namely that of multiple-tree schemes at a network level and that of layered video coding (LVC) at application level, is able to produce a considerable optimization of a cross-layer type with better results as compared to all the other approaches.

According to the LVC paradigm, a compressed bitstream contains different representations of an input video signal. The representations normally differ from one another in terms of spatial and/or temporal resolution and/or quality (e.g., signal-to-noise ratio) and are obtained via spatial and/or temporal filtering of the input video sequence and via a different modulation of the quantization steps during the coding process.

The representations can be coded separately, according to the approach commonly defined as "multiple description coding" (MDC), or else jointly according to the hierarchical-video-coding (HVC) approach. By adopting the MDC approach, different representations of the input video sequence, normally obtained via temporal and/or spatial filtering of the input video signal, are coded separately, multiplexed, and then transmitted or stored, as illustrated in FIG. 1A.

In said figure, the reference OV designates the original video signal, the reference MDF designates the filtering operation that gives rise to the various representations MD1, MD2, ..., which, at least in principle, can be of any number. The various representations MD1, MD2, ... are to be coded separately in respective coding modules COD1, COD2, ... and then give rise to the input bitstream as a result of a multiplexing operation carried out in a module MUX.

As regards decoding, the representations received can be combined so as to obtain a single representation with a level of faithfulness, referred to the original signal, which depends upon the number of decoded representations received. The advantage of this approach lies in the robustness in regard to transmission errors: if one of the layers gets lost either partially or completely, all the other layers continue to be decodable.

In the HVC approach, different representations of the input video sequence, obtained, for example, via temporal and/or spatial filtering of the input video signal, are coded jointly as hierarchy of multiplexed layers and then transmitted or stored, as illustrated in FIG. 1B.

In said figure, OV designates once again the original video signal, whilst DS designates, for example, a downsampling filter that enables origination of a base layer (or zero layer) BL that is to be coded in an encoder. The higher layers and representations are also coded by a respective encoder. In addition to the original signal OV, said encoders also draw upon the lower layers via a mechanism of prediction generically represented by a block PRED. Also in this case, the various representations coded in the encoders COD1, COD2, ... are then subjected to a multiplexing operation MUX for generating the output bitstream.

As in the case of the MDC approach represented in FIG. 1A, also the HVC approach represented in FIG. 1B is suited to being implemented by resorting, in principle, to any number of representations concatenated with one another by a hierarchical mechanism.

The representation of just two layers provided in the two parts of FIG. 1 hence has the character of basic simplified representation.

In the HVC approach, the hierarchy of the layers is organized in a way such that each layer requires, for being decoded, the lower layers but not the higher ones. As compared to the MDC approach, the HVC approach provides a greater compression efficiency in so far as each higher layer is coded using the intrinsic redundancy existing between the different representations. As drawback, the HVC approach is less robust in regard to transmission errors in so far as, if one layer of the hierarchy gets lost, all the higher layers that depend upon the layer that has been lost are no longer decodable.

Both the MDC approach and the HVC approach enable a general scalability of the output bitstream to be achieved, a characteristic that is desirable in various video-coding applications.

With reference to FIG. 2, a video bitstream SBS obtained from an original signal OV is said to be "scalable" in so far as it presents the characteristic of being partially decodable so as to obtain, for example, a signal SS that presents a reduced spatial resolution, a signal TS that presents a reduced temporal resolution, and/or a signal QS that presents a reduced quality as compared to the original signal. The term "reduced" in regard to spatial resolution, quality, and temporal resolution is used to indicate that the levels of resolution and quality are lower than the ones that can be obtained by decoding the entire bitstream.

The characteristic of scalability enables execution of a low-complexity manipulation of a bitstream that can thus be adapted to specific network conditions (for example, limitations in terms of overall channel passband, or else instantaneous variations of said bandwidth) and/or to the specific characteristics of a terminal (for example, in terms of computational capacity, power-absorption requirements, and/or characteristics of the display).

A traditional single-layer coding paradigm, where a bitstream contains a single representation, as represented in FIG. 3A, envisages that an input video signal OV undergoes coding in an encoder COD to give rise to a bitstream BS containing a single representation of the signal OV with a given spatial resolution, a given temporal resolution, and a given quality—all defined in the coding process—, which are to be reproduced in a way as faithful as possible with the decoding process implemented in a decoder DEC to give rise to an output sequence OS.

A video encoder LCOD of a layered type, as represented in FIG. 3B, produces, instead, starting from the original video signal OV, a scalable bitstream SBS, from which, via an extractor module EXT operating according to configuration parameters CP, it is possible to give rise to a number of sub-streams, SS1 ..., SSN different from one another, that can be decoded in a layered decoder LDEC so as to give rise to a corresponding plurality of output sequences OS1, ..., OSN, each corresponding to one of the representations available in the scalable bitstream SBS.

Both the MDC and HVC approaches are practicable according to the scalable-video-coding (SVC) standard ITU-T/MPEG, which extends the coding standard H.264/AVC with video-coding tools, designed for supporting the scalability with good performance in terms of compression efficiency. The MDC approach can also be implemented by multiplexing different bitstreams singly in compliance with single-layer coding standards, such as MPEG-2, MPEG-4, VC-1, and H.264/AVC.

FIG. 4 is a block diagram representing a possible SVC encoder structure.

In the specific case represented, reference is made to a coding that envisages generation of one base layer (or zero layer) BL and two higher layers EL1 and EL2 forming enhancement layers. Once again, the structure represented in FIG. 4 may be extended to any number K of higher layers EL1, ..., ELK.

In the case of the example represented in FIG. 4, the base layer BL is obtained from the input video signal OV, subjected to two cascaded decimation operations 2D and is then subjected to temporal decomposition TD, motion/texture coding MTC, and an entropy coding ECOD.

The layer EL1 is obtained starting from the result of the first decimation operation 2D and subjected to the same treatment operations TD, MTC and ECOD referred to previously, with the difference represented by the fact that the operation MTC for coding the layer EL1 takes into account the results of an prediction operation PRED starting from the results of the processing MTC of the layer BL.

The layer EL2 is obtained directly from the original video signal OV and is also subjected to the treatment operations TD, MTC and ECOD referred to previously.

In the case of the layer EL2, the coding operation MTC takes into account the results of a prediction operation PRED starting from the results of the homologous coding operation MTC implemented for the layer EL1.

In the diagram of FIG. 4, the base layer BL may be altogether in compliance with the H.264/AVC specifications. The higher layers EL1, EL2 (and possibly others) can follow the HVC paradigm, exploiting precisely tools of predictive interlayer coding to improve coding efficiency.

The same diagram of FIG. 4 may, however, be implemented also without using inter-layer prediction (i.e., eliminating the blocks PRED), following the MDC approach.

At the end of the entropy coding process ECOD, each image of each layer is coded in one or more data packets, referred to as NALUs (Network Abstraction Layer Units) subjected to a multiplexing operation in a module MUX so as to give rise to the final scalable bitstream SBS, the structure of which is represented schematically in FIG. 5.

Each NALU comprises a slice, corresponding to a set of macroblocks (for example, square 16×16-pixel blocks) belonging to one and the same image.

In FIG. 5, the SEI field represents a field in which a message is present that conveys information on the scalability of the bitstream SBS. Various SPS fields (one for each layer) then contain information. There are then present PPS fields, at least one for each SPS field where information is present.

The SPS (Sequence Parameter Set) and PPS (Picture Parameter Set) data packets contain some parameters necessary for decoding the bitstream, such as, for example, the dimensions of the images (width and height in pixels) or the type of entropy coding used, or others still. Said parameters are gathered in purposely provided data packets, instead of being transmitted image by image in order to achieve a greater coding efficiency.

Each NALU in turn comprises a header H with fields SI that specify the levels of temporal resolution, spatial resolution, and quality of the image data contained in the corresponding payload. In particular, the payload is configured as Raw Byte Sequence Payload with a slice header SH and the corresponding slice data SD referred to the single macroblocks MB. The action of scaling of the bitstream SBS can hence being implemented simply by disregarding, from the bitstream SBS, all the NALUs corresponding to representations that are not used, keeping, instead, all the useful NALUs.

FIG. 6 regards an example in which different video representations are present, coded in a hierarchical way in layers, wherein each layer provides an enhancement in terms of spatial resolution, temporal resolution, or quality with respect to the preceding or lower layer. In the specific example represented, a base layer or Layer 0, and four enhancement layers from Layer 1 to Layer 4 are provided. Alongside the designation of each layer the corresponding parameters of resolution and quality are specified. The vertical arrows in FIG. 6 represent the dependence between layers. For example, to decode the layer 2 (i.e., considering layer 2 as target layer) it is possible to disregard from the stream all the NALUs of layers 3 and 4. The layers 1 and 2 may instead be kept intact: the target layer (which in the example considered is the layer 2) depends upon the layer 1, which in turn depends upon the layer 0.

It is then again possible to distinguish between images that provide random-access points (RAPS) for the bitstream and images that do not have this capacity. Defined as RAP image is an image that, together with all the subsequent images, can be decoded independently of any other preceding image. Video decoding can then start at any point corresponding to a RAP image: this is a fact to be taken into account in the case of video browsing or else a real-time video streaming, for example to pass from one channel to another.

In the case of a scalable video, the RAP images are also useful for providing switching points between one layer and another, as represented in FIG. 7. Here, the blocks represented with dashed lines correspond to images that are not displayed, whilst the blocks represented with solid lines correspond to completely decoded and displayed images. The curved arrows represented with thin dashed lines represent the prediction motion-compensated from one image to another, whereas the larger arrows represent switching between one layer and another.

The RAP images can then be used for switching the video decoding and the display from a base layer BL to a higher layer or enhancement layer EL (thus represented in FIG. 7A) or else, equivalently, for switching in the opposite direction from a layer EL to the base layer BL (see FIG. 7B).

In the H.264/AVC and SVC standards, the random-access points are provided by IDR (Intra Decoder Refresh) images.

Another standard layered video coding that is able to provide multiple representations is the Multi-View Coding (MVC) extension of the H.264/AVC standard, which enables joint coding of different "views" of the same subjects obtained via an array of different cameras so that each view represents the same scene, observed, however, in a different perspective. The MVC extension enables coding of the different views as a set of layers of a global bitstream, with a concept hence similar to that of the SVC standard. The applications of the MVC extension are 3D television and free-viewpoint television (FTV).

There may be a commercial advantage that derives from offering to the end user the possibility of choosing the quality of the multimedia contents received on the basis of the preferences and requirements of said end user; this, in particular, in a context of a P2P type, such as a heterogeneous multiple-tree P2P environment that houses a scalable streaming platform and considering the fact that a traditional approach of a simulcast type (see, for example, U.S. Pat. No. 4,255,814) affords the user the possibility of switching from one quality layer to another, but envisaging the simultaneous diffusion of the same video contents with different quality layers.

In this regard, the layered-coding techniques present advantages in terms of bandwidth and overall system efficiency and that a document such as the document US 2007/0112811 A1 describes a generic P2P video-coding system designed for transmitting media contents of a scalable type.

This document suggests assembly of minimal-coding units in packets for transmitting them, without, however, providing, for example, a full description of an effective interface between the P2P engine and the video encoder/decoder. The mechanism of transposition of the coded media contents into P2P chunks is important, the aim being to avoid significant problems of inefficiency that may lead to waste of the overall network bandwidth such as to prevent in effect a number of clients from accessing efficiently the desired representations contained in the video streams and/or from switching in an adaptive way from one representation to another. In particular, the document cited above does not describe criteria such as to enable the peers to exchange control signals, the nature of said signals, and the effect that said signals can have on the packetizing process.

It is likewise known from the work of J. Rieckh, "Scalable Video for Peer-to-Peer Streaming", Master Thesis, Institute of Communications and Radio-Frequency Engineering, Technical University of Vienna, Summer, 2008 (at the moment of filing of the present patent application available on the Internet as http://publik.tuwien.ac.at/files/PubDat_166631.pdf) an experimental P2P scalable system that is able to integrate the JSVM software (i.e., the reference software model for the SVC standard developed by the JVT committee) with a P2P platform referred to as Pulsar. However, this system regards a very specific case, in which a known P2P platform is used for exchanging scalable media contents specifically coded with the SVC standard using an SVC scalability criterion of a medium-grain type (MGS).

In the framework of the panorama of the corresponding art outlined previously, there emerges the need to have available solutions that will enable diffusion of media contents in a P2P context in a functional and efficient way, overcoming the intrinsic drawbacks of the solutions outlined previously.

BRIEF SUMMARY

Several embodiments of the present disclosure, relate to corresponding systems and to a computer program product that can be loaded into the memory of at least one computer and comprises portions of software code that can implement the steps of the methods described herein when the product is run on at least one computer. As used herein, reference to a such a computer program product is understood as being equivalent to reference to a computer-readable medium containing instructions for control of the processing system for co-ordinating implementation of the method according to the disclosure. The reference to "at least one computer" or "at least one computer processor" is intended to highlight the possibility of embodiments being implemented in a modular and/or distributed form.

One embodiment identifies a system architecture for distribution of scalable video bitstreams in peer-to-peer (P2P) environments.

One embodiment comprises a complete terminal architecture, means for interfacing a P2P network with scalable video encoders/decoders, and/or an adaptation mechanism for optimal band allocation between the peers.

One embodiment envisages modalities for assembly of the video packets as a function of the video representations to which they belong.

One embodiment provides criteria for sharing this information between a number of layers and/or information on how the peers can effectively access and choose different video-coding representations also as a function of the relations existing between the video layers.

In one embodiment, according to the type of layered coding (MDC or HVC, for example SVC) it is possible to obtain different types of advantages in the distribution of streaming contents. SVC leads to advantages at a network level, whereas the MDC technique presents advantages at an application level and, to a certain extent, at a network level. In the case of SVC, advantages are achieved at the level of co-operation between peers.

In one embodiment that uses an MDC, one advantage that can be achieved is represented by robustness in regard to chunks lost and in terms of flexibility of assignment of the descriptions. The robustness in regard to chunk losses is an important aspect and a measure of the performance of the streaming systems. In the case where the descriptions are obtained by means of spatial filtering, the fact of having available multiple descriptions affords the possibility of distributing the information of spatially close pixels on sub-streams that are to be routed on different paths and to be shared in different sub-overlays. When the client loses a chunk of a description, the effect on the end-user side is an image in which the missing pixels are uniformly distributed over the entire image, rather than being concentrated in a single region of the image itself, a fact that renders correction of the error far easier. This advantage is of course paid for with a loss in terms of compression efficiency in so far as the descriptions are generally very redundant and hence the overall bit-rate given the same quality is considerably higher than the single-description case. In addition to this, one embodiment based upon MDC renders the system more flexible at a network level. In effect, the sub-overlays can be reconfigured to render the distribution of the contents on the network more efficient in terms of distribution of the workloads, optimization of routing or in relation to network congestion. Since MDC is not coded on hierarchical levels, the peers can pass from one sub-overlay to another and still perceive the same quality of the stream, this being purely a function of the number of different descriptions received. If the end user desires a quality corresponding to two descriptions, for the client it is sufficient to find just any two of the sub-streams available to obtain the desired quality.

Other advantages at a network level are observable in the case where a peer is disconnected (or else changes channel) or in the case of network congestion. If a peer at the edge of the overlay is no longer served by a certain link (for example, on account of a failure or of a phenomenon of congestion), the peer itself can change its request for the description and migrate to another sub-overlay, maintaining the same quality of the original stream.

In one embodiment, the solution described herein provides an overlay network of a peer-to-peer type dedicated to distribution of coded video signals in a layered way (Layered Video Coding).

In one embodiment, unlike what occurs in the traditional video-coding paradigm, in which a compressed bitstream contains a single representation of a video signal, layered coding offers multiple representations in the framework of a scalable bitstream.

In one embodiment, said representations can be coded jointly with a coding of a hierarchical type in such a way that decoding of each layer (understood in general as any subset of the complete video data) is also based upon one or more lower layers in the hierarchy of the scheme.

In one embodiment, coding can be independent so that each layer in the stream is decodable in an independent way.

In one embodiment, layered video coding affords a scalability of the video signal, with advantages in many digital-video applications, enabling ready adaptation of the video signal to the network and/or to the characteristics of the terminals.

In one embodiment, recourse to networks of a peer-to-peer type affords possibilities of access to an environment created at an application level in terms of local software application, enabling communication with other peers that use the application on the Internet, this being achieved by creating an overlay network at an application level, where each end user is able to share his resources with the set of overlays.

In one embodiment, this aspect of a co-operative type fully exploits the advantages of P2P systems in so far as it enables the community to increase indefinitely without any need for powerful and dedicated servers, thus affording significant advantages in terms of network scalability and reducing the costs of investments for new streaming applications.

In one embodiment, recourse to layered video coding implies significant synergistic advantages in relation to the use of P2P systems, in particular ones that use multiple-tree graphs, combining the presence of multiple-data video streams with evident advantages both at a network level and at an applicational level.

In one embodiment, thanks to recourse to SVC and to an optimized configuration of the overlay network, there are improvements in terms of network efficiency as regards the distribution of the contents, rendering search for candidate peers easier.

In a context of a P2P type, such as a heterogeneous multiple-tree P2P environment that houses a scalable streaming platform, one embodiment leads to considerable advantages both at a network level and at an applicational level. At the same time, the user is afforded the possibility of switching from one quality layer to another while avoiding simultaneous diffusion of the same video content with different quality layers. The user receives (and, if necessary, pays in a differentiated way) only what he is effectively interested in and/or is able to receive, and the source of the contents stores just one main stream instead of a number of different streams, thus achieving advantages in terms of bandwidth cost since globally the servers provide the users with a smaller amount of data.

In one embodiment, by using MDC it is possible to improve robustness in regard to data losses, thus achieving a greater flexibility in the assignment of the descriptions. The use of MDC, for the purpose of rendering distribution of the contents more efficient, enables a peer to change the overlay without modifying its video quality, which constitutes an important feature for commercial applications.

BRIEF DESCRIPTION OF THE SEVERAL VIEWS OF THE DRAWINGS

Embodiments will now be described, purely by way of non-limiting example with reference to the annexed representations, wherein.

DETAILED DESCRIPTION

Illustrated in the ensuing description are various specific details aimed at an in-depth understanding of the embodiments. The embodiments can be implemented without one or more of the specific details, or with other methods, components, materials, etc. In other cases, known structures, materials or operations are not illustrated or described in detail in order to avoid rendering various aspects of the embodiments obscure.

Reference to "one embodiment" in the context of the present description is intended to indicate that a particular configuration, structure, or characteristic described in relation to the embodiment is comprised in at least one embodiment. Furthermore, phrases such as "in one embodiment", which may be present in different points of this description, do not necessarily refer to the same embodiment. In addition, particular conformations, structures or characteristics can be combined in an adequate way in one or more embodiments.

The references used herein are merely provided for reasons of convenience and hence do not define the sphere of protection or the scope of the embodiments.

Various embodiments described herein may be implemented in the form of an overlay network of a peer-to-peer (P2P) type, dedicated to distribution of scalable video bitstreams.

Figure 8:
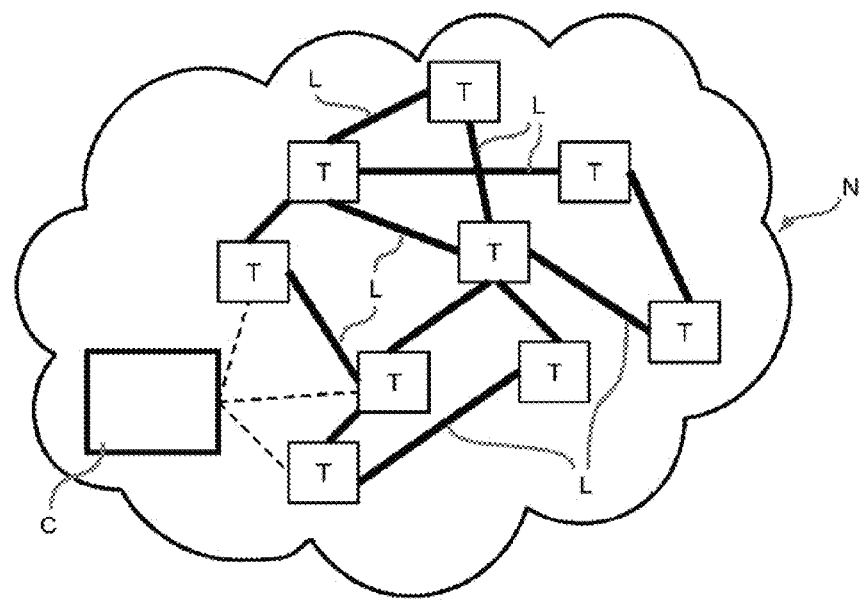
FIG. 8 illustrates a network architecture according to one embodiment.

FIG. 8 is a schematic illustration of the possible architecture of such a P2P network comprising a plurality of terminals T implemented in the framework of a pre-existing packet-switching network N of a LAN, MAN or WAN type, such as for example the Internet. Consequently, in the examples here considered, the nodes of the P2P network also form part of the network N and are designated as terminals T.

A terminal T belonging to the P2P network is referred to as "peer". The network N can hence also comprise one or more server nodes that do not form part of the P2P network and/or that do not exchange data of interest for the purposes of the solution considered herein and, as such, do not strictly form part of the overlay, even though they can play a role in assisting the mechanisms of communication between peers. An example of such a server is the "tracker" server in the case of the BitTorrent protocol.

In the diagram of FIG. 8, the lines represented as connecting the terminals T constitute the links L of the peer-to-peer network. The block C, coupled with dashed lines, refers to the possible presence of a node (server) with the function of coordinator.

Figure 9:
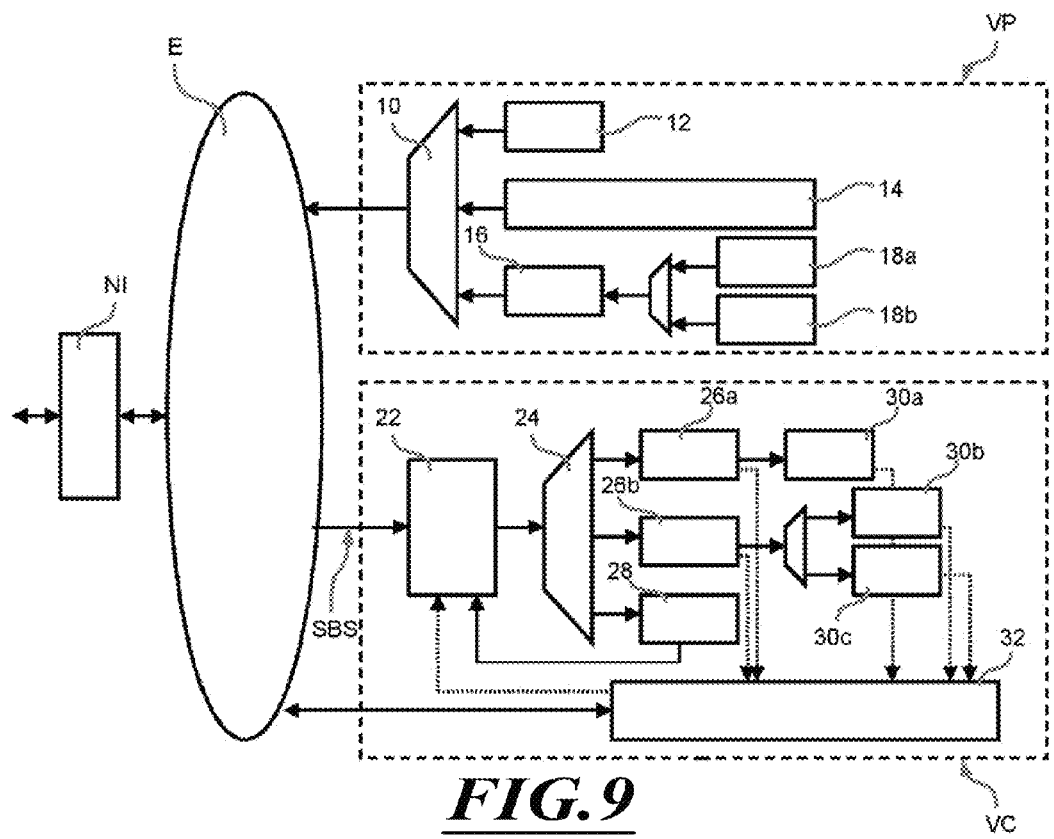
FIG. 9 is a block diagram of a terminal architecture according to one embodiment.

In a possible functional architecture of a terminal T, as represented in FIG. 9, there can be distinguished four main elements, namely:

a producer or source VP of media video contents;
a consumer VC of media video contents;
a peer-to-peer engine E; and
a network interface NI.

The aforesaid elements perform the following basic functions:

the video producer VP generates video bitstreams sent to the peer-to-peer engine E;

the video consumer VC obtains video bitstreams from the peer-to-peer engine E in view of their possible storage and reproduction;

the engine E exchanges the data corresponding to the video bitstreams at input and at output with the other terminals T connected by the P2P network; and the network interface NI converts the data packets between the protocol used by the P2P network and the protocol used by the underlying packet-switching network N.

It will be appreciated that, at least in principle, each peer T in the P2P network can function as:

source of video bitstreams that are to go to other peers;
consumer of video bitstreams obtained from other peers; and
element for exchange of video data obtained from some peers and distributed to other peers in the network.

In one embodiment, the purpose of the video producer VP is to supply the engine E with a scalable video bitstream.

Such a bitstream can be obtained (via a general multiplexing mechanism) starting from different sources, such as a memory 12, a land, satellite, or wireless connection or link (or a connection or link of some other nature) 14 or else by an encoder 16 that encodes video signals obtained starting from one or more video-capturing sources 18a, 18b . . . (which, of course, may be of any number).

Whatever the effective source, the scalable bitstream supplied by the video source or video producer VP to the engine E contains a plurality of representations (multiple representations) obtained via spatial filtering and/or temporal filtering and/or via modulation of the quantization step during the encoding process (operations executed both at the producer VP or elsewhere, with the producer who receives from another source a signal already in the form of a scalable bitstream) so as to supply to the engine E a signal having characteristics of temporal and/or spatial scalability and/or scalability in terms of quality and/or of capacity to provide different views of the same video subject.

The multiple representations can be encoded independently in the form of a number of elementary video bitstreams multiplexed with one another, or else encoded jointly in the form of a single bitstream with a layered structure.

In one embodiment, the scalable bitstream is obtained by multiplexing different streams in compliance, for example, with standards such as H.262/MPEG-2, MPEG-4, VC-1 or H.264/AVC.

In one embodiment, the scalable bitstream is in compliance with the extension Scalable Video Coding (SVC) of the H.264/AVC standard (annex G). In one embodiment, the scalable bitstream SBS is in compliance with the Multi-View Coding (MVC) extension of the H.264/AVC standard (annex H).

The scalable bitstream (whatever the source: the storage device 12, the land/satellite/wireless connection 14, real-time encoding by an encoder 16 connected to one or more devices for video-signal capture 18a, 18b) may also be multiplexed in view of their distribution on the P2P network with other forms of multimedia data (for example audio, music, text) or else metadata (for example, in compliance with the MPEG-7 or MPEG-21 standards).

Figure 5:
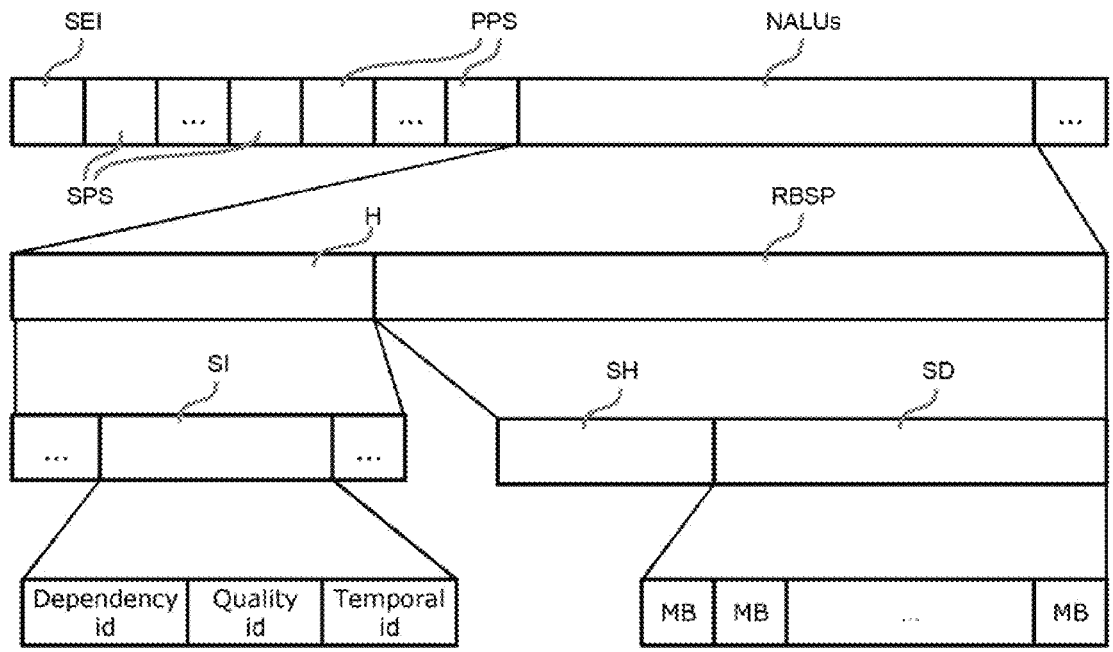
FIG. 5 is a diagram representing an example structure of a final scalable bitstream.
Figure 6:
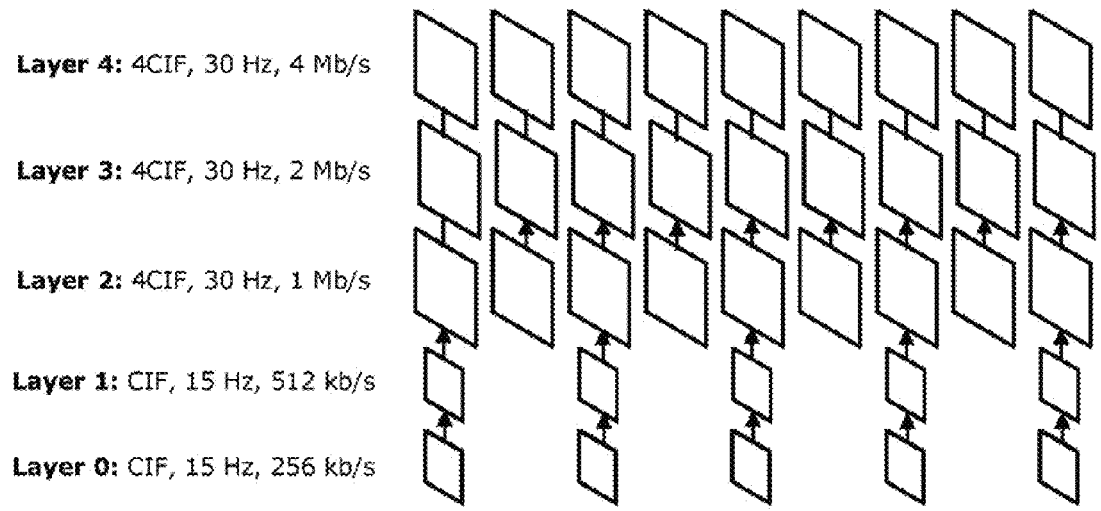
FIG. 6 is a diagram illustrating how example different video representations are coded in a hierarchical way in layers.
Figure 7A:
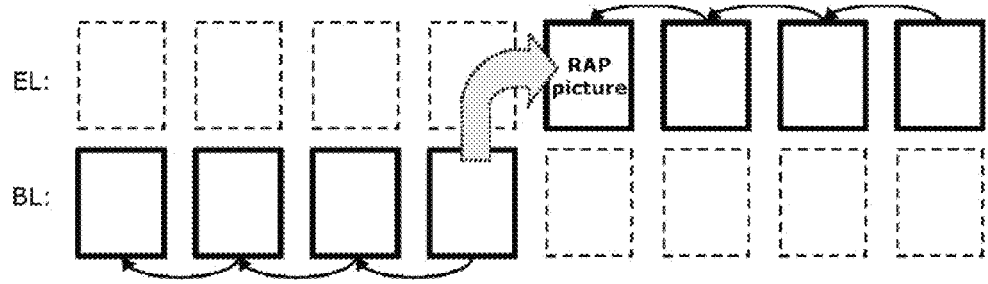
FIG. 7A is a diagram illustrating how random-access point images can be used for switching the video decoding and the display from a base layer to a higher layer or enhancement layer.
Figure 7B:
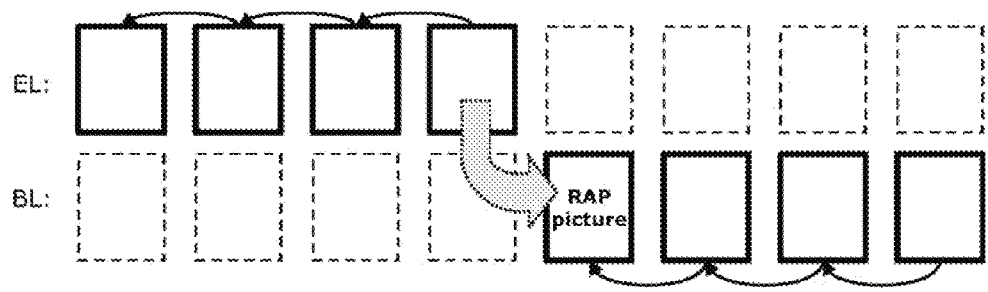
FIG. 7B is a diagram illustrating how random-access point images can be used for switching the video decoding and the display from a base layer to a higher layer or enhancement layer or for switching in the opposite direction from a higher layer to the base layer.

In one embodiment, on the basis of the scheme already described with reference to FIG. 5, the scalable bitstream SBS supplied by the producer VP is formed by a series of data packets referred to as NALUs (Network Abstraction Level Units), each of which contains an entire image, or a part thereof, or else the syntactic information for decoding the bitstream correctly (for example: dimensions of the image, frame-rate, etc.).

As has been seen, each NALU comprises a header and a payload, where the header can contain information corresponding at least to the scalable layer to which the image belongs and to whether the image is a RAP image or not.

As has already been said, within each layer of the scalable hierarchy, an image is considered RAP (Random-Access Point) if—together with all the subsequent images—it can be decoded without resorting to any image that precedes it. RAP images provide switching points between different layers in the scalable bitstream, thus enabling switching of the video display from one representation to another.

Figure 10:
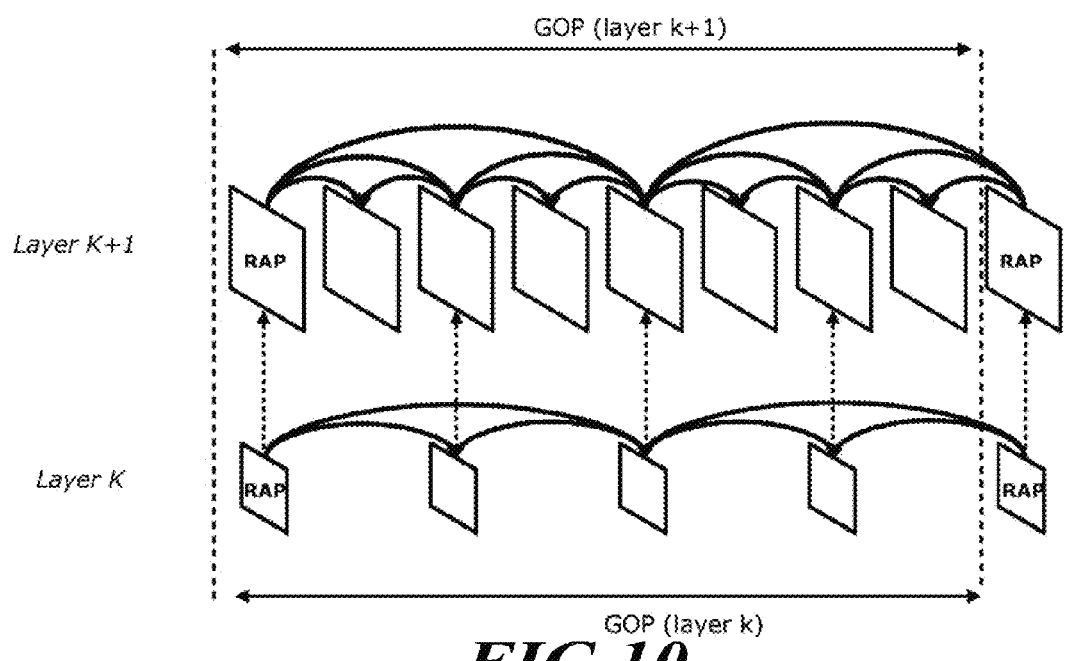
FIG. 10 represents the organization of the so-called groups of pictures (GOPs) in a sequence of digital video images.

FIG. 10 illustrates the possibility, for each layer (for example for two generic layers K and K+1, including the base layer such that K=0) of defining a group of pictures (GOP) comprising the set of the images comprised between two RAP images, including (in the example illustrated here) the first image of the set and excluding the last one.

In various applications there are RAPs at fixed intervals in time and, in one embodiment, all the GOPs have a pre-defined and fixed dimension for each layer.

In general, FIG. 10 shows that the GOPs can have dimensions that are different for different layers: for example, in the layers K and K+1 illustrated in FIG. 10 the GOPs comprise, respectively, 8 and 4 images.

In each layer, each GOP is coded in a certain number of NALUs.

Figure 11:
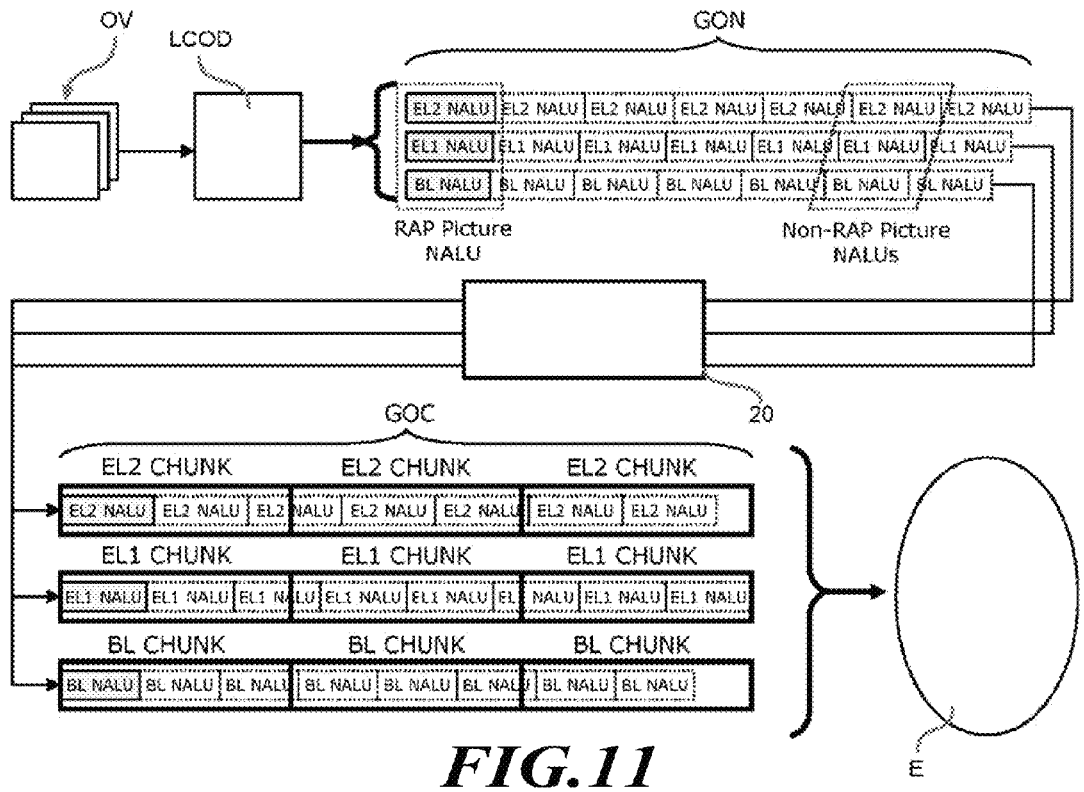
FIG. 11 is a schematic illustration of a technique for encapsulating data according to one embodiment.

For reasons of simplicity, and with reference to the diagram of FIG. 11, each group of NALUs is referred to as GON. Once again it will be noted that the NALUs have in general different dimensions, not only between different layers (BL, EL1, EL2, . . . ), but also within one and the same layer and from image to image.

The function of the P2P engine is that of exchanging the data with the other peers in the P2P network. The data are exchanged in the form of packets of fixed length referred to as "chunks", which have a fixed and predetermined length.

FIG. 11 illustrates one embodiment corresponding to a possible conversion of the groups of NALUs or GONs (which, as has been said, can have different lengths) into so-called chunks. The conversion is implemented via an encapsulation module 20, which acts on the GONs downstream of the video encoder LCOD, which generates the NALUs and the corresponding GONs starting from the input video images OVs.

In one embodiment, the module 20 converts the groups of NALUs (GONs) into groups of chunks (GOCs) with a mechanism of encapsulation in which each NALU in a GON can be segmented so as to fit to a GOC, in such a way that each chunk contains one or more NALUs and/or fragments of NALUs. The length of the GOCs, i.e., the number of chunks for each layer, can be either constant or variable as a function of the rate control applied by the producer VP.

Figure 12:
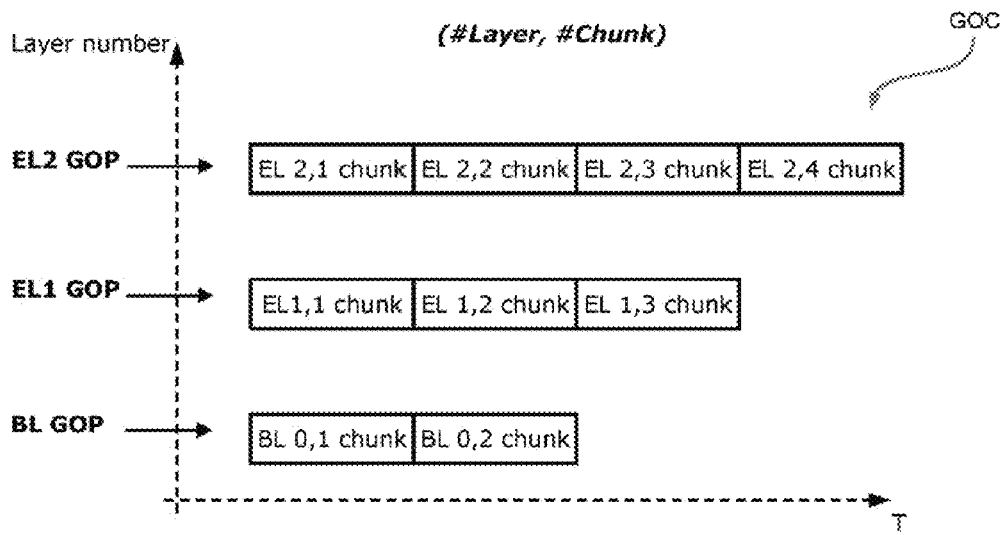
FIGS. 12 and 13 illustrate various operations of treatment of the so-called chunks according to one embodiment.

In the embodiment considered here, each chunk contains only data belonging to a given layer of the scalable bitstream SBS, and FIG. 12 illustrates, as a function of time (Time), the organization of the GOPs for the various layers (layer number), i.e., for the base layer BL (BL GOP), and for the higher layers EL1 (EL1 GOP), EL2 (EL2 GOP), etc., encapsulated in chunks.

Each chunk is identified by the information inherent in the layer to which it refers (BL0, EL1, EL2 . . . ) and in the sequential order of the chunks (1 chunk, 2 chunk, 3 chunk, 4 chunk, etc.); that is, the j-th chunk of the EL i-th layer is indicated as EL i, j chunk, whilst for the base layer (or layer 0) i=0, so that the j-th chunk of the base layer is designated by BL 0, j chunk.

Figure 13:
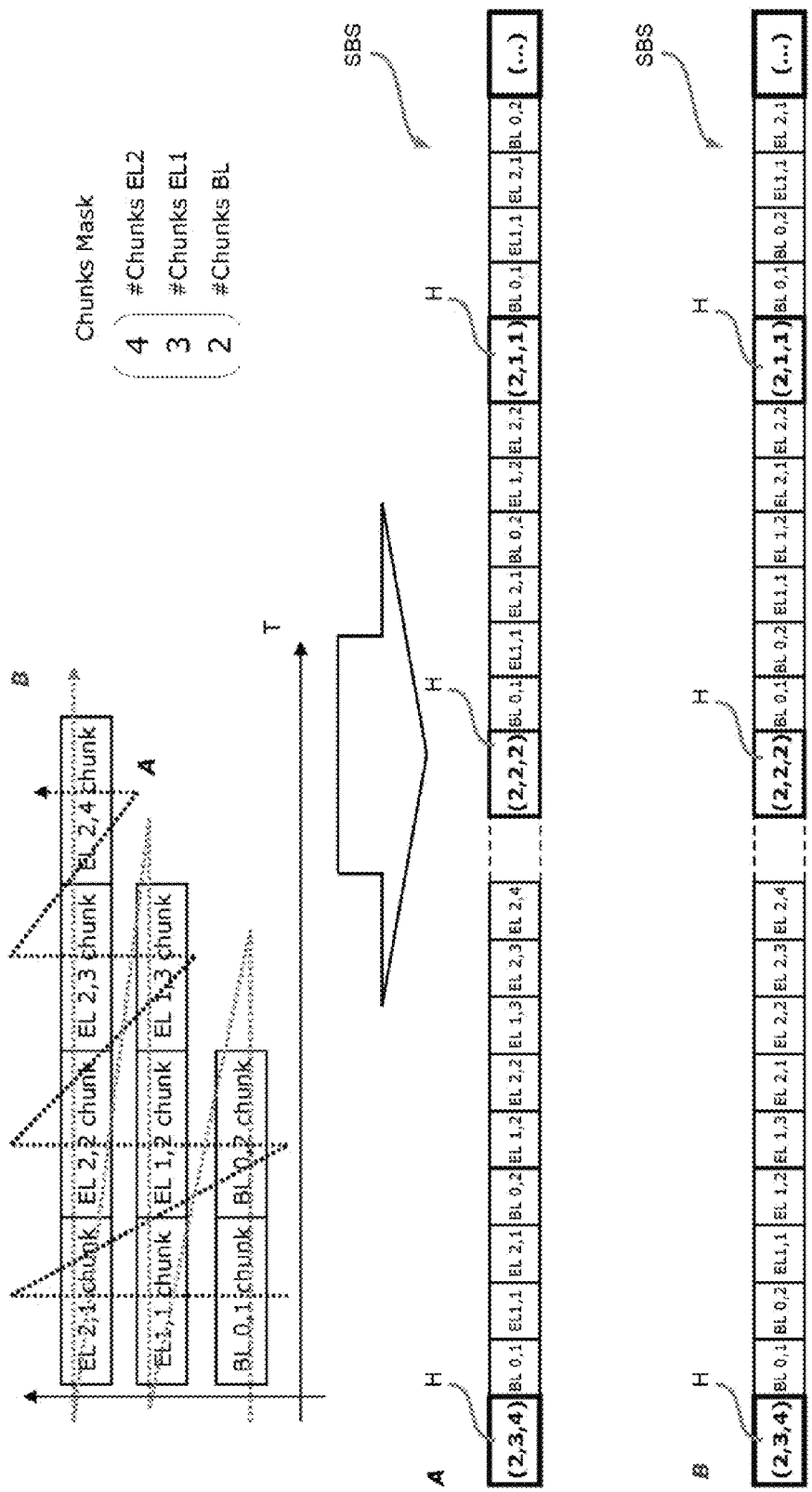

To enable extraction of a sub-stream of specific quality from the overall bitstream SBS, it is possible to define, as illustrated in FIG. 13, a mapping function based upon a chunk mask that is to indicate the number of chunks for each layer as well as a law of priority of synchronization for specifying how the chunks are entered into the bitstream SBS.

Each GON can thus receive the corresponding information, as specified in the map of the chunks.

The chunk mask is decided at the start (in the case of applications at constant bitrate) or during the streaming session (in the case of applications at variable bitrate) by the peer-to-peer engine E.

To have a fixed number of chunks per layer, the video encoder LCOD can comprise a control algorithm at constant bitrate so as to code each GOP into a group of NALUs, designated by GON, the overall length of which corresponds as far as possible to the length of the GOC.

In order to avoid bandwidth waste in the case of applications at variable bitrate, it is possible to use a variable number of chunks per layer.

This characteristic enables adaptation of the amount of information to the content of the stream itself, or else real-time (or on-the-fly) change of quality.

For instance, in the case where there is a fixed scene with a constant background that lasts several seconds, the encoder needs fewer data as compared to the case where the scene has various objects that are moving. Consequently, according to the specific video scene, the number of chunks per layer can be adapted to the amount of information effectively required for coding each layer.

Changing the quality "on the fly" or "in real time" means varying the amount of information conveyed by the stream. According to the change of the platform conditions (rendering device and network conditions), the number of chunks per layer can be adapted to the new amount of information (greater or smaller) required for coding each layer.

The chunk mask can hence vary during the streaming session and is specified by the P2P engine via a header at each start of a GOC.

An example of chunk mask is represented at the top right in FIG. 13, where the three numbers (2, 3, 4) refer, proceeding from bottom up, to the exemplifying diagram of FIG. 12, where there are present:

2 chunks at the base layer BL or layer 0;
3 chunks at the layer 1 EL1; and
4 chunks at the layer 2 EL2.

FIG. 13 also represents two possible schemes of priority of synchronization that can be used for multiplexing the chunks in the main stream, producer VP side (i.e., at input to the peer-to-peer engine E), and for identifying correctly the chunks, user or consumer side (i.e., at output from the peer-to-peer engine E), causing the source VP and the users VC to follow the same criteria so as to be able to cause the semantic meaning of each chunk to coincide, enabling, for example, a user VC to extract from the scalable bitstream, a certain subset or sub-stream corresponding to the maximum quality that the user desires or is able to reproduce.

It will on the other hand be appreciated that (as may be inferred from FIG. 11) the synchronization at the level of formation of the GONs is given by the alignment of the NALUs belonging to a RAP image.

The bottom part of FIG. 13 shows two possible organizations of the scalable stream SBS, highlighting, on the one hand, the possibility of using different chunk masks; for example, in addition to the mask (2, 3, 4) represented at the top right in said figure, different masks, such as (2, 2, 2) or (2, 1, 1).

On the other hand, the bottom part of FIG. 13 highlights the possibility of using different synchronization criteria, corresponding, for example, to:

the scheme A, where the chunks are organized by setting in sequence the chunks with the same order number in the various layers; i.e., BL 0, 1; EL 1, 1; EL 2, 1 then BL 0, 2; EL 1, 2; EL 2, 2 and then EL 1, 3; EL 2, 3 and so forth, namely proceeding by successive columns;

the scheme B, where the chunks corresponding to a single layer are set one after another, passing from the base layer to the higher layers, i.e., BL 0, 1; BL 0, 2, then EL 1, 1; EL 1, 2; EL 1, 3 and then EL 2, 1; EL 2, 2; EL 2, 3 and so forth, namely proceeding by successive TOWS.

The effect of the adoption of one or other of the two synchronization criteria may be appreciated from the comparison of the example A with the example B in the bottom part of FIG. 13. In the two scalable bitstreams SBS represented, likewise possible, before each group of chunks or GOC, the presence of a header H that conveys the corresponding chunk mask.

The mask (2, 3, 4) corresponds to the example represented in FIG. 12. The mask (2, 2, 2) corresponds to elimination of the last chunk of the layer EL1 and of the last two chunks of the layer EL2. The mask (2, 1, 1) corresponds to elimination of the last two chunks of the layer EL1 and of the last three chunks in the layer EL2. As has already been said, according to the applicational requirements, the chunk mask can remain constant, or else be varied.

In the embodiment considered here, in each layer, each group of pictures GOP is coded in a group of NALUs (GON), which is in turn encapsulated in a group of chunks (GOC) made up of a certain number of chunks. The number of chunks is in general variable for each layer, as is illustrated, for example, in FIG. 12. Each GOC starts with the NALU data corresponding to a RAP image, so that the start of each GOC may constitute a switching point for each layer.

Each chunk is in a data packet comprising a header and a payload, where the payload contains the NALU data and the header contains at least the information corresponding to the video layer to which the NALUs belong in the payload. It will be appreciated that this interfacing criterion can be applied also to protocols that are able to manage a variable number of bytes per chunk.

Figure 1A:
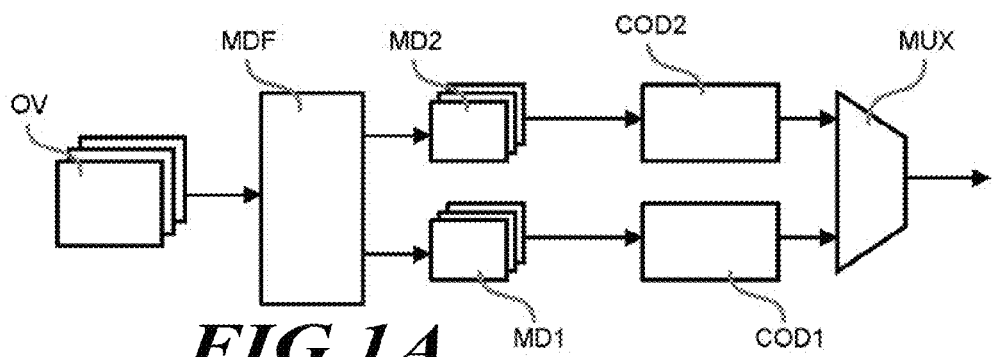
FIG. 1A is a block diagram illustrating an example system for separately coding, multiplexing, and then transmitting a video sequence.
Figure 1B:
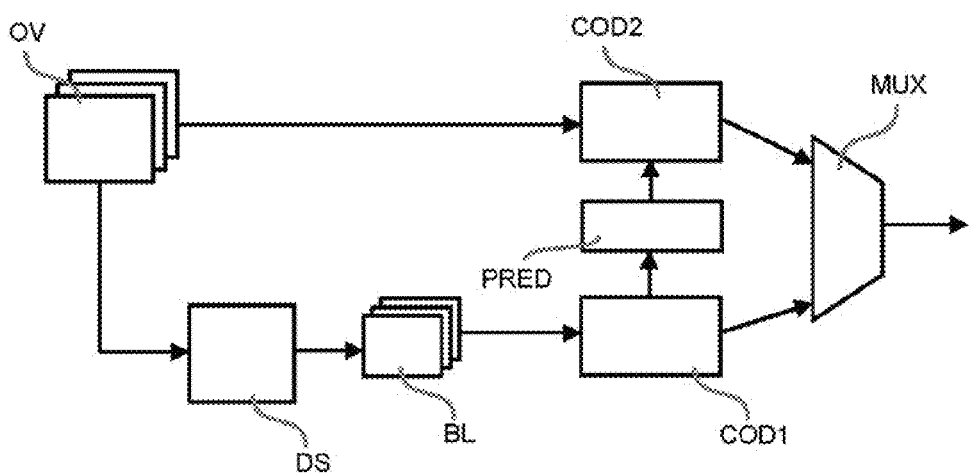
FIG. 1B is a block diagram illustrating an example system for jointly coding, multiplexing, and then transmitting a video sequence.
Figure 2:
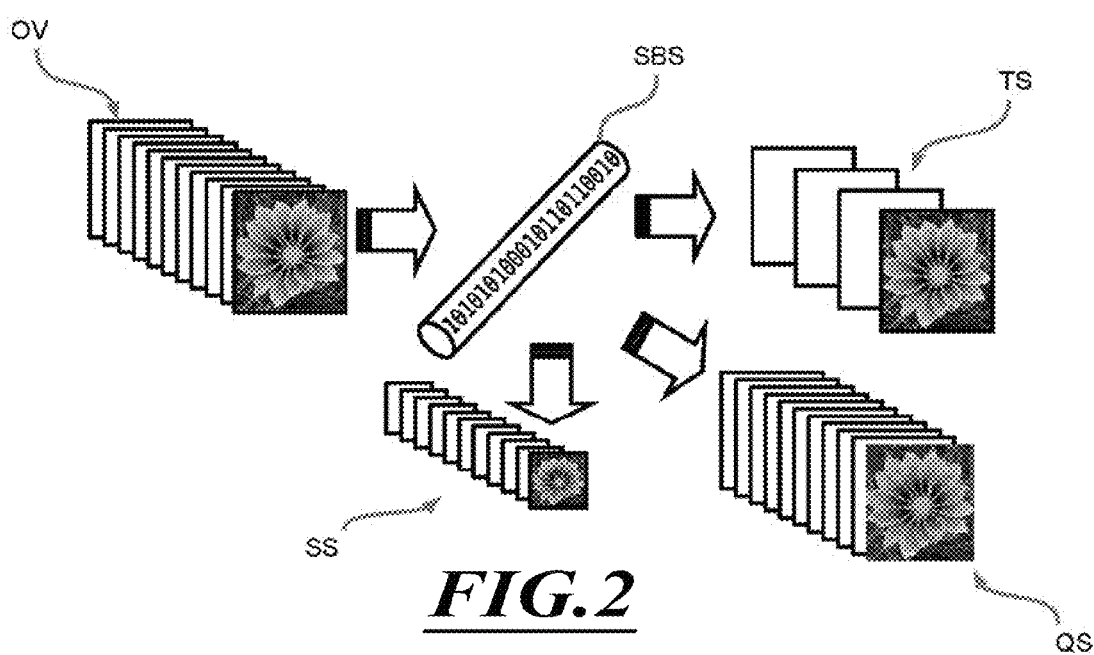
FIG. 2 is a diagram illustrating the scalability of a video bitstream obtained from an original signal.
Figure 3A:
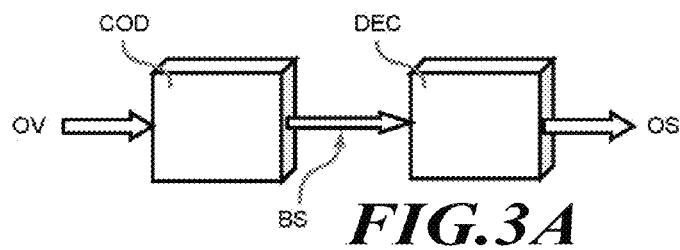
FIG. 3A is a block diagram illustrating a traditional single-layer coding paradigm, where a bitstream contains a single representation.
Figure 3B:
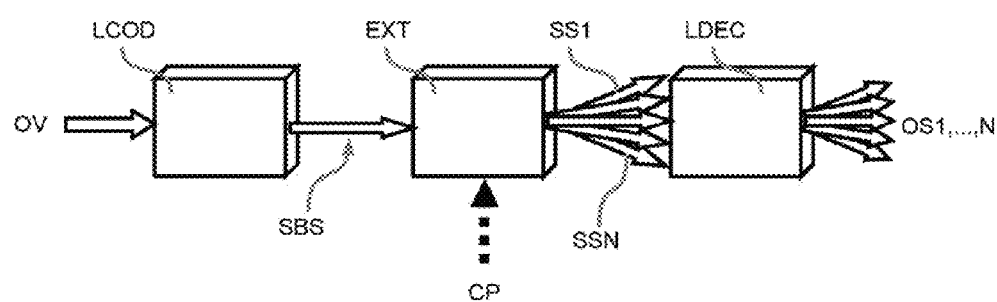
FIG. 3B is a block diagram representing an example video encoder of a layered type that produces a scalable bitstream.
Figure 4:
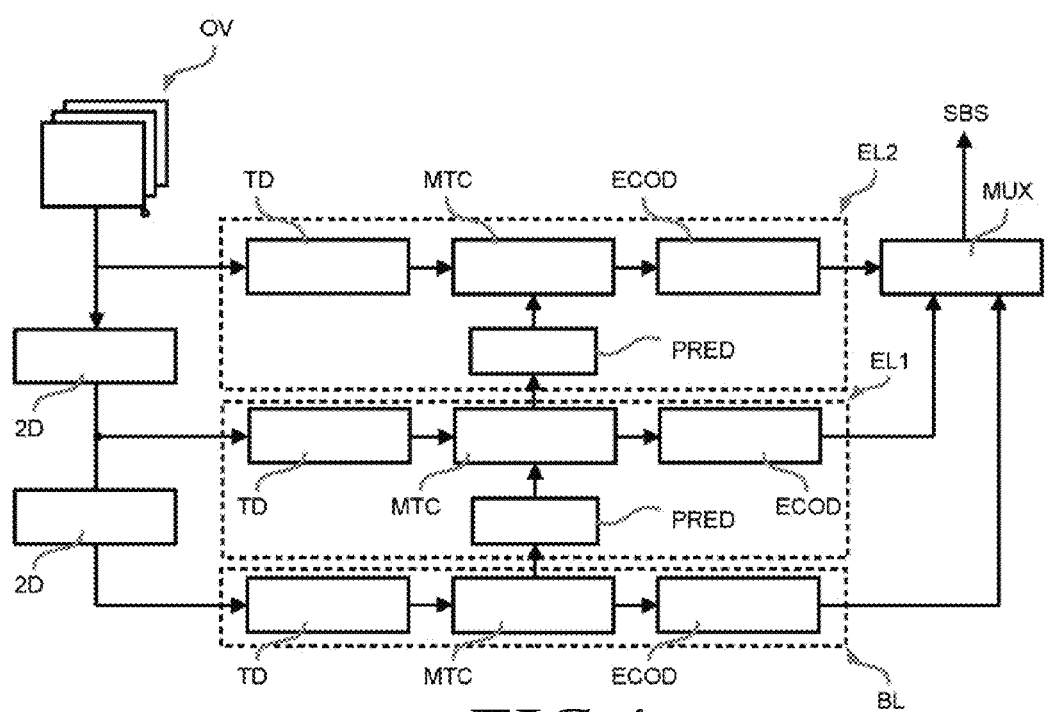
FIG. 4 is a block diagram representing a possible scalable-video-coding encoder structure.
Figure 14:
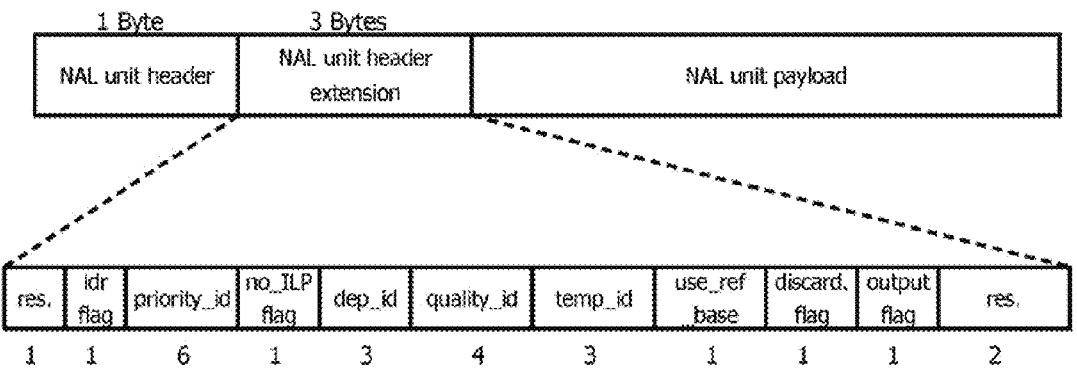
FIG. 14 represents the organization of the so-called NALUs according to one embodiment.

FIG. 14 is a schematic illustration of the possible organization of a NALU, with specific reference to the adoption of a scalable video-coding criterion (SVC) (see also the general diagram of FIG. 4).

When a terminal T in FIG. 8 wishes to become a consumer peer VC in a P2P network, it seeks in the first place the information corresponding at least to the following elements:
number of layers;
temporal resolution, spatial resolution, quality and bitrate of each layer;
reference layer for each layer (to be able to understand the hierarchy of the layers).

A terminal T supplies, instead, said information when is functions as video producer VP in regard to another peer: a "consumer" terminal VC can then decide which layers it wishes to receive from the P2P network so as to set up a connection L with the peers that have the data corresponding to the layers selected.

To return to the diagram of FIG. 9, when it acts as consumer VC, a terminal receives from the P2P network the data (e.g., video data) organized in chunks for decoding them in a storage device and/or for displaying them.

In one embodiment, the terminal configured as video consumer can hence comprise a stream extractor 22, with cascaded thereto a demultiplexer 24 for distributing the various (sub)streams extracted from one or more video decoders 26a, 26b (also these may be present in any number: the fact that the example illustrated presents two of them has merely the nature of example) and from a storage structure 28, such as for example a hard disk HDD.

Each decoder is then able to drive one or more display units 30a, 30b, 30c, in general different from one another as regards the characteristics of (spatial/temporal) resolution, quality, bitrate, etc.

The diagram of FIG. 9 refers to a solution in which one or more streams and demultiplexed layers are sent to a memory 28, without being decoded. This can be a choice dictated by the fact that a coded bitstream usually occupies much less space in memory than a decoded bitstream. Of course, it is also possible to consider storing decoded bitstreams.

At the same time, it will be appreciated that the "consumer" structure VC can in actual fact present in a far simpler form than the one described and may comprise, for example, just one decoder with associated thereto a display (thus rendering superfluous the presence of the demultiplexer 24 and without envisaging the memory 28).

In general, it will be assumed that the scalable stream received from the network via the network interface NI and the peer-to-peer engine E is a sub-stream of the original scalable bitstream SBS supplied to the network by the terminal functioning as video producer VP.

In one embodiment, the terminal acting as consumer VC comprises an adaptation engine 32, which is able to have a feedback effect on the peer-to-peer engine E so as to choose the set of layers to receive.

In one embodiment, the adaptation engine 32 executes a decision-making procedure, which chooses the layers to receive as a function of different parameters, such as for example:
the (maximum) spatial/temporal resolution of the display device or devices 30a, 30b, 30c currently active;
the (maximum) bandwidth available;
the (maximum) processing capacity of the video decoders (26a, 26b);
the user requirements/requests.

On the basis of said parameters, the adaptation engine 32 decides which are the layers of interest and communicates this information to the P2P engine, which sets up a connection to the peers that are able to supply the data corresponding to the layers selected.

The adaptation engine 32 performs this function at least once, when the terminal T adds itself to the network in P2P overlay for the purpose of understanding which layers of the scalable bitstream to trace at the other peers.

In one embodiment, the adaptation is made in a continuous way, identifying at each moment the layers to be received by reacting to one or more of the following factors:
changes in the user preferences/requirements;
instantaneous variations of the network conditions (overall uploading/downloading bandwidth, jitter, congestion, and other factors);
connection to the terminal of new devices, which may, for example, receive and use new layers thanks to a greater processing-power availability or to a greater display resolution;
disconnection of devices previously connected to the terminal, with the possibility of "ignoring" one or more layers, for example when the processing power and/or the display capacity/resolution that are/is able to exploit them are/is no longer present.

In one embodiment, switching from one layer to another is performed where there are RAP images in such a way that switching takes place with a delay depending upon the frequency with which said random-access points are present in the stream. Said frequency of recurrence of the RAP images can be either constant or variable.

In one embodiment, in which the RAP frequency is variable, it is constrained to an upper limit so as to limit the delay at a value such as to enable a high flexibility, without it proving troublesome for the user.

It will on the other hand be appreciated that all of what has been exemplified previously in relation to the interface engine E with reference to media data coded with a stratified coding (HVC, SVC) comprising a base layer BL and one or more enhancement layers EL1, EL2, . . . (possibly linked by a mechanism of prediction—see blocks PRED of FIG. 4), also applies to a multiple-description coding (MDC, FTV) that supplies a plurality of descriptions of the same media content not necessarily linked to one another in a base layer/enhancement ratio. This applies, in particular, as regards the organization of the groups of chunks (GOCs), which can be organized in a number of layers, each corresponding to one of the descriptions of a multiple-description coding.

The present description hence applies—in general—to all the embodiments in which media data packets, such as NALU packets, are coded with a coding that supplies a plurality of representations of one and the same media content and in which both the groups of data packets (GONs) and the groups of chunks (GOCs) are organized in a number of layers corresponding to the plurality of representations supplied by the coding. The base and enhancement layers BL, EL1, EL2, . . . are hence just one example of said different representations.

Figure 15A:
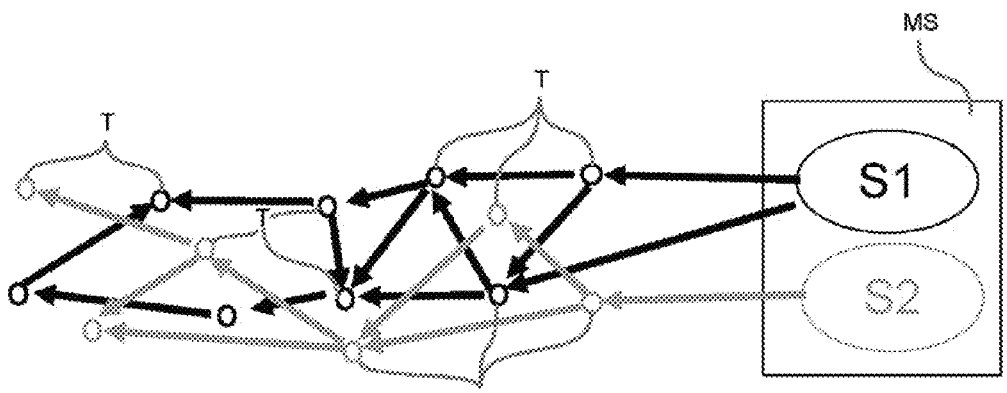
FIGS. 15A and 15B illustrate modes of provision of media contents in a network.

FIG. 15A refers to a context in which distributed to terminals T comprised in a P2P network are media contents (for example, video contents) with at least two different quality layers (for reasons of simplicity of illustration reference may be made to a "low" quality layer S1 and a "high" quality layer S2). In the case considered in FIG. 15A, the two quality layer S1 and S2 are distributed—independently for each layer—starting from a single main server MS in conditions such that the nodes (i.e., the terminals T) involved in receiving the "high" layer S2 can receive said contents only from the main server MS or else from another peer node that already receives the high contents. This mode of operation in practice requires organization—for instance, according to the modalities discussed in the introductory part of the present description—of two distribution networks that are in effect independent of one another: one dedicated to the distribution of the contents S1 and the other dedicated to the distribution of the contents S2.

If a source of contents (broadcaster) makes available, for example, the same video contents with two different quality layers but coded independently, the P2P engine is forced to handle the entire overlay as being constituted by independent elements, one for each stream, even though the video contents are the same. In other words, by resorting to the diagram of FIG. 15A, each terminal T interested in/capable of receiving the high layer bitstream S2 receives it—integrally—either from the server MS or via the chain of one or more other terminals T that already receive it.

Figure 15B:
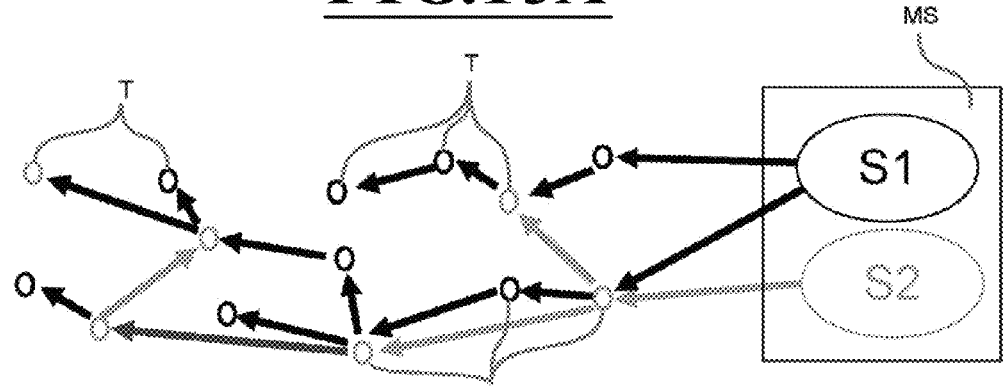

FIG. 15B refers, instead, to the possibility of supplying the same contents S1 and S2 to a network of terminals T of a peer-to-peer type, envisaging the distribution of the base layer L0 of an SVC (see FIG. 4) to all the nodes T and likewise envisages the distribution of the higher quality layers (for reasons of simplicity in FIG. 15B, reference is made, as in the case of FIG. 15A, to just one higher layer S2) not as entire flow but in the form of the corresponding enhancement layer or layers (enhancement layers EL1, EL2 etc.).

In other words, a scalable bitstream SBS will come out of the main server MS with the structure represented in FIG. 13, and the single terminal T, according to its requirements/potential (manifested through the adaptation engine 32 of FIG. 9), will extract the sub-stream or sub-streams of its specific interest, obtaining the corresponding chunks from the peers that are in possession thereof, according to the information contained in the chunk mask associated to bitstreams or to the single sections thereof.

This occurs (once again with reference, for reasons of simplicity, to just two quality layers, S1 and S2) in a scenario deriving from the overlay of the entire community of terminals, which requires the base layer (hence, for example S1=BL), and of a sub-overlay, which shares the enhancement layer EU (hence, S2=BL+EL1). This context is interesting in so far as each peer has the faculty of interacting, as regards the base layer, with the entire community of the terminals T that receive it. Since P2P systems are based upon co-operation, this scenario is interesting since each peer is able to request the contents shared as base layer (shared by the entire community of the users), on which one or more quality enhancement layers are selectively superimposable. In this way, if the overlay shared is greater, there exist greater possibilities of finding sources of supply of contents located nearby.

FIG. 16 aims at highlighting the advantages afforded by the application in a P2P context of the multiple-description coding (MDC). In the specific case, it is assumed that the main server MS will make available the same media content in the form of two different descriptions D1 and D2, here not linked by an HVC or SVC mechanism of a hierarchical type, as considered previously. In other words, it is assumed in this case that the descriptions D1 and D2 are approximately equivalent to one another from the quality standpoint, whilst their possible combination leads to having available a higher quality layer: i.e., if reference is once again made to the two quality layers S1 ("low") and S2 ("high") referred to previously, it may be hypothesized, from the quality standpoint, that $D1 \cong D2 \cong S1$ and $D1+D2=S2$.

In one embodiment, the two (or more) descriptions D1 and D2 can correspond to different "views" of the same subjects, obtained via an array of different cameras in such a way that each view represents the same scene, observed, however, according to a different viewpoint, in a scheme of the type known as free-viewpoint television (FTV).

Figure 16A:
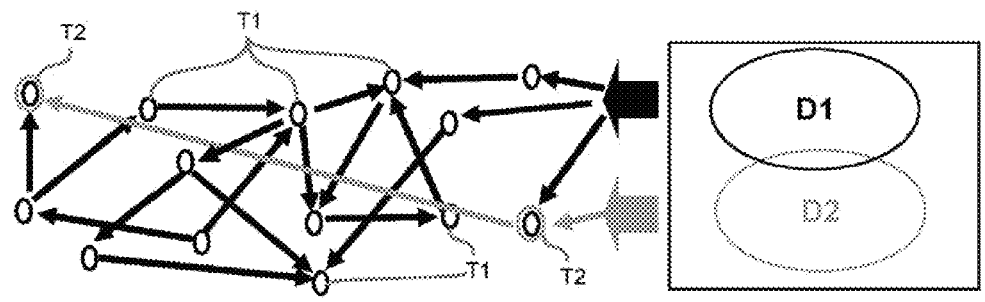
FIGS. 16A and 16B also illustrate modes of provision of media contents in a network.

In particular, FIG. 16A shows that in a context substantially resembling that of FIG. 15A, a particular terminal designated by T2 that is interested in receiving both of the two descriptions D1 and D2 can receive the two descriptions only from the server MS or from another terminal T2 that has available both of them.

Figure 16B:
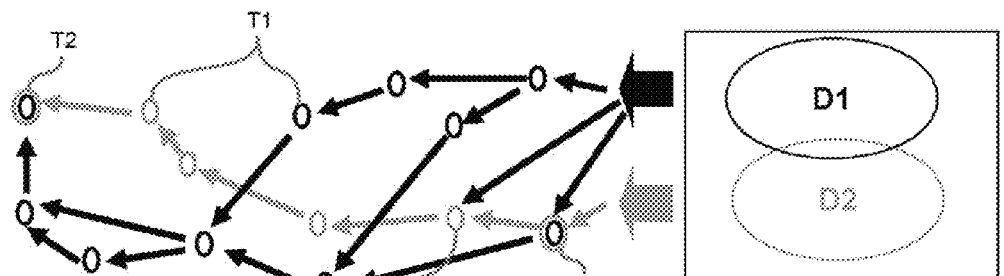

Instead, by resorting, as illustrated in FIG. 16B, to a solution that combines MDC to the P2P philosophy, the terminal T2 is able to obtain the description D1 from a terminal T1, the description D2 from another terminal T1 when neither the one nor the other of these two terminals T1 acting as "providers" has in itself available both of the representations D1 and D2.

In this embodiment, the terminals T1, T2 of the peer-to-peer network are able to access selectively a number of descriptions in a multiplicity of different descriptions (e.g., D1, D2) of the same media content (e.g., a video stream) and combine them with one another (e.g., to obtain a higher quality layer).

Figure 17:
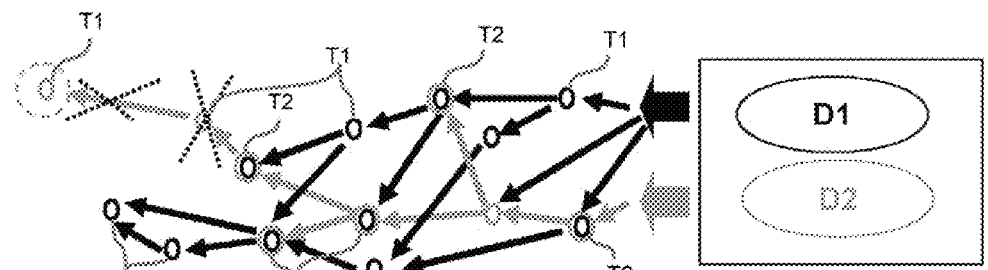
FIGS. 17 and 18 are schematic illustrations of modes of provision of media contents in a network.
Figure 18:
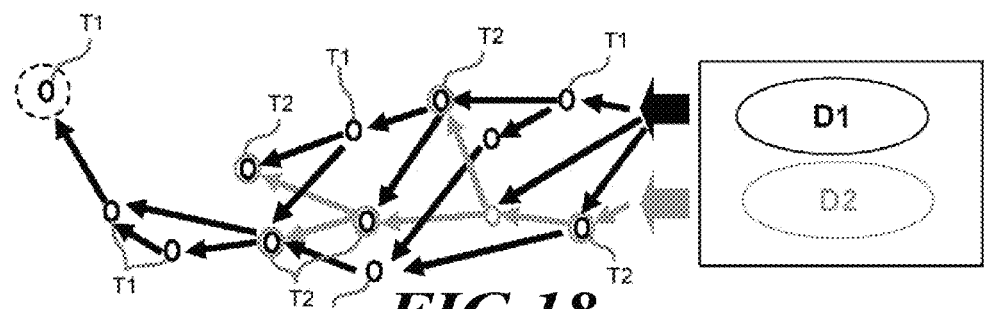

FIGS. 17 and 18 show how the use of the MDC technique in a P2P network advantageously enables tackling of phenomena of failure or of network congestion.

As in the case of the views of FIG. 16, also in FIGS. 17 and 18 the reference T2 designates the terminals of the peer-to-peer network that have available both of the descriptions D1 and D2, whilst the reference T1 designates the terminals that have available just one of said descriptions.

FIG. 17 regards in particular to the case of a generic peer Pn (the one enclosed in a dashed circle), constituted by a terminal T1, which has so far acquired, for example, the description D1 of a certain media content from another terminal T1 functioning as "mother", and which, following upon a phenomenon of network congestion (or failure) loses the connection with respect to said mother peer.

FIG. 18 shows how, by exploiting the availability of multiple descriptions D1 and D2 of the same media content, the same daughter peer Pn can continue to receive the contents by connecting up to another mother terminal T1 that will have available said content in the form of any of the descriptions (for example, also the description D2) made available in the peer-to-peer network. The peer Pn, which first received said multimedia content in the form of the description D1, can continue to receive said content even though a peer that is able to stand in for the preceding mother peer, supplying it with the same content in the form of the same description D1, is not immediately available.

In this embodiment, the terminals T1, T2 of the peer-to-peer network are able to access selectively a number of descriptions in a multiplicity of different descriptions (e.g., D1, D2) of the same media content (e.g., a video stream) with the capacity of accessing one of said different descriptions (e.g., D2) as a substitution for another description that is no longer available (e.g., D1, which is no longer available on account of a failure or a state of congestion), thus preserving access to the corresponding media content.

The MDC is not coded on hierarchical layers and the peers can pass from one sub-overlay to another and still perceive substantially the same quality of the stream, since the quality in this case depends merely upon the number of the different descriptions received. If the user requires a quality corresponding to two descriptions, it is sufficient to find just any two of the sub-streams available to obtain the required quality from the corresponding terminal.

Other advantages are observable at a network level in the case where a peer is disconnected (or else changes channel) or in the case of network congestion. As has been seen, a peer at the edge of the overlay is no longer served by a single traditional link: the peer is able to change the request for the description and migrate to another sub-overlay, maintaining the same quality of the original stream.

The solution considered here is suited also to containing possible phenomena of band waste of the provider at a physical level of topology of the network.

Assume that a client is located in a position generically very remote from the source of a given media content and asks for two descriptions D1 and D2 of said contents, whilst all the clients along the path to said remote client ask for just one description.

In this framework, it is not efficient to have a lot of clients that ask for and obtain, for example, D1 and just one remote peer that asks for D1+D2, rendering it necessary to get the description D2 to pass through all the routers arranged along the path, without using it for satisfying any request: operating in this way would occupy the entire infrastructure to satisfy a request manifested by just one peer, with a consequent very low efficiency. In order to prevent all the physical routers along the path from forwarding two equivalent descriptions, of which then only one is used for satisfying the requirements of the vast majority of the users, whilst the other serves just one user, it is possible to intervene with the mechanism described previously, by causing the routers that are to forward the description D2 to the "remote" user to modify (at least in part) their request from D1 to D2. In this way, the descriptions D1 and D2, forwarded to the remote user that has requested them, are both used for satisfying the requirements of users arranged along the path to the remote user.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    transferring to or from a Peer-to-Peer network, encoded media data packets in groups of packets, said groups of data packets having different lengths with respect to each other, and
    encapsulating the groups of data packets in groups of chunks, respectively, with each chunk being of fixed length larger than a length of a data packet of the respective group and including one or more of: said data packets and/or fragments of said data packets, the transferring and encapsulating being implemented with at least one computer processor.

2. The method of claim 1 wherein said data packets convey sequences of groups of pictures and wherein each of said groups of data packets includes data packets corresponding to images included in a same group of pictures.

3. A method comprising:
    transferring to or from a Peer-to-Peer network, encoded media data packets in groups of packets, said groups of data packets having different lengths with respect to each other; and
    encapsulating the groups of data packets in groups of chunks, respectively, with each chunk being of fixed length and including one or more of: said data packets and/or fragments of said data packets, the transferring and encapsulating being implemented with at least one computer processor, wherein said data packets convey sequences of groups of pictures, each of said groups of data packets includes data packets corresponding to images included in a same group of pictures, said data packets convey sequences of video images that include random access point images to be decoded independently of any preceding image in a same sequence and said groups of pictures include images between a pair of random access point images plus one random access point image of the pair.

4. The method of claim 1 wherein said data packets have been encoded by a coding scheme providing a plurality of representations of same media content and wherein said groups of data packets and said groups of chunks are arranged in a plurality of layers corresponding to said plurality of representations provided by said encoding.

5. The method of claim 4 wherein said coding scheme is a multiple description coding scheme providing a plurality of descriptions of same media content.

6. The method of claim 4 wherein said coding scheme is a layered coding scheme over a plurality of layers and wherein said groups of data packets and said groups of chunks are arranged over a plurality layers corresponding to the plurality of layers of said layered coding scheme.

7. The method of claim 6 wherein said layered coding scheme is a coding scheme including a base layer and at least one enhancement layer of said base layer.

8. The method of claim 7 wherein said base layer and said at least one enhancement layer are linked to each other by a prediction mechanism wherein each of the plurality of layers of said layered coding scheme, other than said base layer, is encoded as a function of at least one respective lower layer.

9. The method of claim 4, comprising associating with said groups of chunks a chunk mask representative of a correspondence between individual chunks in the associated group of chunks and said plurality of layers corresponding to said plurality of representations.

10. The method of claim 9 wherein said chunk mask indicates how many chunks in the associated group of chunks correspond to a given layer out of said plurality layers corresponding to said plurality of representations.

11. The method of claim 9, comprising providing said chunk mask in the headers of said groups of chunks as made available in said Peer-to-Peer network.

12. The method of claim 4, comprising arranging chunks in an associated group of chunks according to a synchronization law, the arranging including arranging sequentially chunks corresponding to different representations of the same media content.

13. The method of claim 4, comprising arranging chunks in the groups of chunks are arranged according to a synchronization law, the arranging including arranging sequentially chunks related to a same representation.

14. The method of claim 4, comprising making available said groups of chunks in said Peer-to-Peer network as a scAIAble bitstream, with the groups of chunks related to the individual representations of the same media content being selectively extractable from said scAIAble bitstream.

15. The method of claim 1, further comprising:
    distributing said encoded media data packets between terminals of said Peer-to-Peer network comprising:
        making said encoded media data packets available as a plurality of different descriptions of a multiple description coding of a given media content, and
        configuring said terminals in said Peer-to-Peer network to access selectively said plurality of different descriptions of said media content; and
        accessing one of said plurality of different descriptions in substitution of another one of said plurality of different descriptions to preserve access to said media content.

16. The method of claim 15, further comprising combining a first one and at least one second one of said plurality of different descriptions.

17. The method of claim 15, wherein the accessing one of said plurality of different descriptions in substitution of another comprises:
    detecting an intervening unavailability of a first one of said plurality of different descriptions of said media content; and
    accessing a second one of said plurality of different descriptions as a substitute of said first one of said plurality of different descriptions to preserve access to said media content.

18. The method of claim 15 wherein said encoded media data packets convey video image sequences including random access points-type images to be reproduced independently of previous images in a respective sequence, and further comprising configuring said terminals of said Peer-to- Peer network to switch access from the one to the other of said plurality of different descriptions of said media content in correspondence with one of said random access points-type images.

19. The method of claim 15, further comprising making said media content available in the form of different descriptions which, when combined with each other, improve representation of said media content.

20. The method of claim 15 further comprising:
making said media content available as a plurality of different descriptions of a multiple description coding starting from a source by:
detecting a request by one of said terminals, which is to be reached from said source through a given path in said Peer-to-Peer network, to access at least a first and second description of said plurality of different descriptions to be combined with each other; and
once said request is detected, causing a set of terminals in said Peer-to-Peer network arranged along said given path to use said second description as a substitute to said first description.

21. The method of claim 1, further comprising:
distributing said encoded media data packets between the terminals of said Peer-to-Peer network by:
making said encoded media data packets available as a base layer and at least one enhancement layer of a layered coding of a given media content, and
configuring said terminals in said Peer-to-Peer network to selectively access said base layer and said at least one enhancement layer and combine said base layer and said at least one enhancement layer.

22. The method of claim 21, further comprising combining said base layer and said at least one enhancement layer.

23. The method of claim 21, further comprising:
detecting a mode of exploitation of said media content by a respective terminal, and
controlling selective access of the respective terminal to said base layer and to said at least one enhancement layer as a function of said mode of exploitation.

24. The method of claim 21 wherein said encoded media data packets convey video image sequences of which said base layer provides a basic representation and said at least one enhancement layer conveys an improvement of said basic representation in terms of temporal resolution, special resolution or quality.

25. The method of claim 21 wherein said encoded media data packets convey video image sequences that include random access points-type images to be reproduced independently of preceding images in a respective sequence, and further comprising configuring said terminals of said Peer-to-Peer network to switch access to said base layer and said at least one enhancement layer in correspondence of one of said random access points-type images.

26. An interface engine device comprising:
at least one computer processor;
at least one memory operably connected to the at least one computer processor on which computer executable instructions are loaded causing the at least one computer processor to implement the following operations:
transfer to or from a Peer-to-Peer network, encoded media data packets in groups of packets, said groups of data packets having different lengths with respect to each other, and
encapsulate the groups of data packets in groups of chunks, respectively, with each chunk being of fixed length larger than a length of a data packet of the respective group and including one or more of: said data packets and/or fragments of said data packets.

27. The device of claim 26 wherein said groups of chunks are made available to a terminal in said Peer-to-Peer network operating as a user of said encoded media data packets.

28. The device of claim 27 further comprising:
an adaptation engine in operable integration with the interface engine device, the adaptation engine configured for:
detecting a mode of exploitation of said encoded media data packets by said terminal operating as a user, and
controlling said interface engine device in selectively transferring said encoded media data packets from said Peer-to-Peer network to said terminal operating as a user as a function of said mode of exploitation.

29. The device of claim 26 wherein the transfer is from a terminal in said Peer-to-Peer network operating as a source of said encoded media data packets towards a Peer-to-Peer network wherein said encoded media data packets are made available in the form of said groups of chunks.

30. A non-transitory computer readable medium having computer executable instructions stored thereon for performing the following operations:
transferring to or from a Peer-to-Peer network, encoded media data packets in groups of packets, said groups of data packets having different lengths with respect to each other, and
encapsulating the groups of data packets in groups of chunks, respectively, with each chunk being of fixed length larger than a length of a data packet of the respective group and including one or more of: said data packets and/or fragments of said data packets.

31. The non-transitory computer readable medium of claim 30 wherein said data packets convey sequences of groups of pictures and wherein each of said groups of data packets includes data packets corresponding to images included in a same group of pictures.

32. The non-transitory computer readable medium of claim 30 further comprising computer executable instructions stored thereon for performing the following operations:
distributing said encoded media data packets between terminals of said Peer-to-Peer network comprising:
making said encoded media data packets available as a plurality of different descriptions of a multiple description coding of a given media content;
configuring said terminals in said Peer-to-Peer network to access selectively said plurality of different descriptions of said media content; and
performing at least one of: accessing the plurality of said different descriptions and combining them, and accessing one of said plurality of different descriptions in substitution of another one of said plurality of different descriptions to preserve access to said media content.

33. The non-transitory computer readable medium of claim 30 further comprising computer executable instructions stored thereon for performing the following operations:
distributing said encoded media data packets between terminals of said Peer-to-Peer network by:
making said encoded media data packets available as a base layer and at least one enhancement layer of a layered coding of a given media content, and
configuring said terminals in said Peer-to-Peer network to selectively access said base layer and said at least one enhancement layer and combine said base layer and said at least one enhancement layer.

34. The non-transitory computer readable medium of claim 33 further comprising computer executable instructions stored thereon for performing the following operations:
   detecting a mode of exploitation of said media content by a respective terminal, and
   controlling selective access of the respective terminal to said base layer and to said at least one enhancement layer as a function of said mode of exploitation.

35. The non-transitory computer readable medium of claim 33 wherein said encoded media data packets convey video image sequences that include random access points-type images to be reproduced independently of preceding images in a respective sequence, and further comprising computer executable instructions stored thereon for configuring said terminals of said Peer-to-Peer network to switch access to said base layer and said at least one enhancement layer in correspondence of one of said random access points-type images.

36. An apparatus, comprising:
   one or more memories; and
   circuitry coupled to the one or more memories, wherein the circuitry, in operation, transfers groups of encoded media data packets in a Peer-to-Peer network as respective groups of chunks, said groups of encoded media data packets having different lengths with respect to each other with each chunk of a respective group of chunks having a fixed length and at least one chunk of a respective group of chunks including a complete encoded media data packet and at least a fragment of another encoded media data packet.

37. The apparatus of claim 36 wherein the at least a fragment of the another encoded media data packet is a complete encoded media data packet.

38. The apparatus of claim 36 wherein said groups of chunks are made available to a terminal in said Peer-to-Peer network operating as a user of said encoded media data packets.

39. The apparatus of claim 36 wherein a transfer is from a terminal in said Peer-to-Peer network operating as a source of encoded media data packets.

40. An apparatus, comprising:
   one or more memories; and
   circuitry coupled to the one or more memories, wherein the circuitry, in operation, transfers groups of encoded media data packets in a Peer-to-Peer network as respective groups of chunks, said groups of encoded media data packets having different lengths with respect to each other with each chunk of a respective group of chunks having a fixed length larger than a length of an encoded data packet of the respective group of encoded media data packets.

41. The apparatus of claim 40 wherein at least one chunk includes a complete encoded media data packet and a fragment of another encoded media data packet.

42. The apparatus of claim 40 wherein said groups of chunks are made available to a terminal in said Peer-to-Peer network operating as a user of said encoded media data packets.

43. The apparatus of claim 40 wherein a transfer is from a terminal in said Peer-to-Peer network operating as a source of encoded media data packets.

* * * * *